(12) United States Patent
Shoemaker

(10) Patent No.: US 7,275,219 B2
(45) Date of Patent: Sep. 25, 2007

(54) FAST AND ACCURATE RENDERING OF PLIABLE DISPLAY TECHNOLOGY DISTORTIONS USING PRE-CALCULATED TEXEL COVERAGES

(75) Inventor: Garth B. D. Shoemaker, Coquitlam (CA)

(73) Assignee: Idelix Software Inc., Vancouver (CA)

( * ) Notice: Subject to any disclaimer, the term of this patent is extended or adjusted under 35 U.S.C. 154(b) by 775 days.

(21) Appl. No.: 10/358,385

(22) Filed: Feb. 5, 2003

(65) Prior Publication Data

US 2003/0151625 A1 Aug. 14, 2003

(30) Foreign Application Priority Data

Feb. 5, 2002 (CA) ................................... 2370751

(51) Int. Cl.
*G06F 3/00* (2006.01)
*G09G 5/00* (2006.01)

(52) U.S. Cl. ...................... 715/801; 715/802; 715/848; 345/660

(58) Field of Classification Search ........ 715/800–802, 715/781, 848; 345/660–661
See application file for complete search history.

(56) References Cited

U.S. PATENT DOCUMENTS

| | | | |
|---|---|---|---|
| 4,888,713 A | | 12/1989 | Falk |
| 5,638,523 A | * | 6/1997 | Mullet et al. ............... 715/855 |
| 5,670,984 A | * | 9/1997 | Robertson et al. .......... 345/585 |
| 6,256,115 B1 | * | 7/2001 | Adler et al. ................ 358/442 |
| 6,768,497 B2 | * | 7/2004 | Baar et al. .................. 345/661 |
| 6,938,218 B1 | * | 8/2005 | Rosen ........................ 715/850 |

FOREIGN PATENT DOCUMENTS

EP 0 650 144 A1 4/1995

OTHER PUBLICATIONS

Carpendale, Marianne S. T., A Framework for Elastic Presentation Space, Simon Fraser University,1999.
Carpendale, M.S.T., et al., "A Framework for Unifying Presentation Space", Proceedings, UIST'01, Nov. 11-14, 2001 pp. 61-70.
Carpendale, M.S.T. et al., "3-Dimensional Pliable Surfaces: For the Effective Presentation of Visual Information", Proceedings, UIST '95, Nov. 14-17, 1995, pp. 217-226.
Sakamoto, C. et al., "Design and Implementation of a Parallel Pthread Library (PPL) with Parallelism and Portability", Systems and Computers in Japan, vol. 29, No. 2, 1998, pp. 28-35.

(Continued)

*Primary Examiner*—Sy D. Luu
(74) *Attorney, Agent, or Firm*—Joseph Conneely; McCarthy Tetrault LLP

(57) ABSTRACT

A method for generating a presentation of region-of-interest in an information representation including the steps of: selecting a viewpoint for the region-of-interest; selecting a location for the region-of-interest; creating a lens surface having a predetermined location for the region-of-interest; creating a transformed presentation by: determining a mapping for pixel coordinates from the representation to the lens surface by applying a distortion function defining said lens surface to said pixel coordinates; calculating a vector from the predetermined location to the location; and, copying pixel information from the representation to the lens surface according to the mapping as displaced by the vector; and, displaying the transformed presentation on a display screen to generate the presentation of the region-of-interest.

18 Claims, 8 Drawing Sheets

OTHER PUBLICATIONS

Bouju, A., et al., "Client-Server Architecture for Accessing Multimedia and Geographic Databases within Embedded Systems", Proceedings, Database and Expert Systems Applications, IEEE Comput. Soc., Sep. 1-3, 1999, pp. 760-764.

DEng, K. et al., "Texture Mapping with a Jacobian-Based Spatially-Variant Filter", Proceedings, Computer Graphics and Applications, IEEE Comput. Soc., Oct. 9-11, 2002.

* cited by examiner

FAST AND ACCURATE RENDERING OF PLIABLE DISPLAY TECHNOLOGY DISTORTIONS USING PRE-CALCULATED TEXEL COVERAGES

This application claims priority from Canadian Patent Application No. 2,370,751 Filed Feb. 5, 2002, the disclosure of which is incorporated herein by reference.

The invention relates to the field of computer-graphics processing, and more specifically to a method and system for fast rendering of a detail-in-context lens in a detail-in-context presentation.

BACKGROUND OF THE INVENTION

Display screens are the primary interface for displaying information from a computer. Display screens are limited in size, thus presenting a challenge to graphical user interface design, particularly when large amounts of information are to be displayed. This problem is normally referred to as the "screen real estate problem".

Well-known solutions to this problem include panning, zooming, scrolling or combinations thereof. While these solutions are suitable for a large number of visual display applications, these solutions become less effective where sections of the visual information are spatially related, such as maps, three-dimensional representations, newspapers and such like. In this type of information display, panning, zooming and/or scrolling is not as effective as much of the context of the panned, zoomed or scrolled display is hidden.

A recent solution to this problem is the application of "detail-in-context" presentation techniques. Detail-in-context is the magnification of a particular region of interest (the "focal region" or "detail") in a data presentation while preserving visibility of the surrounding information (the "context"). This technique has applicability to the display of large surface area media, such as maps, on computer screens of variable size including graphics workstations, laptop computers, personal digital assistants ("PDAs"), and cell phones.

In the detail-in-context discourse, differentiation is often made between the terms "representation" and "presentation". A representation is a formal system, or mapping, for specifying raw information or data that is stored in a computer or data processing system. For example, a digital map of a city is a representation of raw data including street names and the relative geographic location of streets and utilities. Such a representation may be displayed visually on a computer screen or printed on paper. On the other hand, a presentation is a spatial organization of a given representation that is appropriate for the task at hand. Thus, a presentation of a representation organizes such things as the point of view and the relative emphasis of different parts or regions of the representation. For example, a digital map of a city may be presented with a region magnified to reveal street names.

In general, a detail-in-context presentation may be considered as a distorted view (or distortion) of a portion of the original representation where the distortion is the result of the application of a "lens" like distortion function to the original representation. A detailed review of various detail-in-context presentation techniques such as Elastic Presentation Space may be found in a publication by Marianne S. T. Carpendale, entitled "A Framework for Elastic Presentation Space" (Carpendale, Marianne S. T., *A Framework for Elastic Presentation Space* (Burnaby, British Columbia: Simon Fraser University, 1999)), and incorporated herein by reference.

In general, detail-in-context data presentations are characterized by magnification of areas of an image where detail is desired, in combination with compression of a restricted range of areas of the remaining information (i.e. the context), the result typically giving the appearance of a lens having been applied to the display surface. Using the techniques described by Carpendale, points in a representation are displaced in three dimensions and a perspective projection is used to display the points on a two-dimensional presentation display. Thus, when a lens is applied to a two-dimensional continuous surface representation, for example, the resulting presentation appears to be three-dimensional. In other words, the lens transformation appears to have stretched the continuous surface in a third dimension.

One shortcoming of these detail-in-context presentation systems is that the rendering of a raster image which has under-gone a distortion through the application of one or more lenses (e.g. pyramid lenses) can be time consuming. Both the CPU and input/output systems of the detail-in-context presentation system can be taxed when performing such a rendering. Past techniques for rendering these images have usually involved texturing the raster image upon a three-dimensional triangulated surface. This technique can provide fast results, especially when combined with the use of accelerated three-dimensional rendering hardware, but rendering can be slow when no such hardware is present. In addition, the result is only an approximation of the true distortion of the lens with accuracy being limited by the coarseness of the triangulated mesh. It would desirable to have a method for rendering an accurately distorted raster image quickly and without the need for specialized rendering hardware.

A need therefore exists for the fast and effective display of detail-in-context lens presentations in detail-in-context presentation systems. Consequently, it is an object of the present invention to obviate or mitigate at least some of the above mentioned disadvantages.

SUMMARY OF THE INVENTION

In general, the present invention provides for the effective presentation of detail-in-context lens type presentations in detail-in-context presentation systems through the use of improved rendering techniques.

According to one aspect of the invention, there is provided a method for generating a presentation of a region-of-interest in an information representation including the steps of: selecting a viewpoint for the region-of-interest; selecting a location for the region-of-interest; creating a lens surface having a predetermined location for the region-of-interest; creating a transformed presentation by: determining a mapping for pixel coordinates from the representation to the lens surface by applying a distortion function defining said lens surface to said pixel coordinates; calculating a vector from the predetermined location to the location; and, copying pixel information from the representation to the lens surface according to the mapping as displaced by the vector; and, displaying the transformed presentation on a display screen to generate the presentation of the region-of-interest. Preferably, the step of determining a mapping includes perspectively projecting the lens surface onto a plane spaced from the viewpoint. Preferably, the pixel information includes colour information.

Advantageously, the invention allows detail-in-context presentations that involve lens translations to be rendered without fully recalculating texel mappings.

BRIEF DESCRIPTION OF THE DRAWINGS

Embodiments of the invention may best be understood by referring to the following description and accompanying drawings. In the description and drawings, line numerals refer to like structures or processes. In the drawings.

DETAILED DESCRIPTION OF THE PREFERRED EMBODIMENTS

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention.

The term "data processing system" is used herein to refer to any machine for processing data, including the computer systems and network arrangements described herein. The term "Elastic Presentation Space" ("EPS") (or "Pliable Display Technology" ("PDT")) is used herein to refer to techniques that allow for the adjustment of a visual presentation without interfering with the information content of the representation. The adjective "elastic" is included in the term as it implies the capability of stretching and deformation and subsequent return to an original shape. EPS graphics technology is described by Carpendale in "A Framework for Elastic Presentation Space" (Carpendale, Marianne S. T., *A Framework for Elastic Presentation Space* (Burnaby, British Columbia: Simon Fraser University, 1999)), which is incorporated herein by reference. In EPS graphics technology, a two-dimensional visual representation is placed onto a surface; this surface is placed in three-dimensional space; the surface, containing the representation, is viewed through perspective projection; and the surface is manipulated to effect the reorganization of image details. The presentation transformation is separated into two steps: surface manipulation or distortion and perspective projection.

Figure 1:
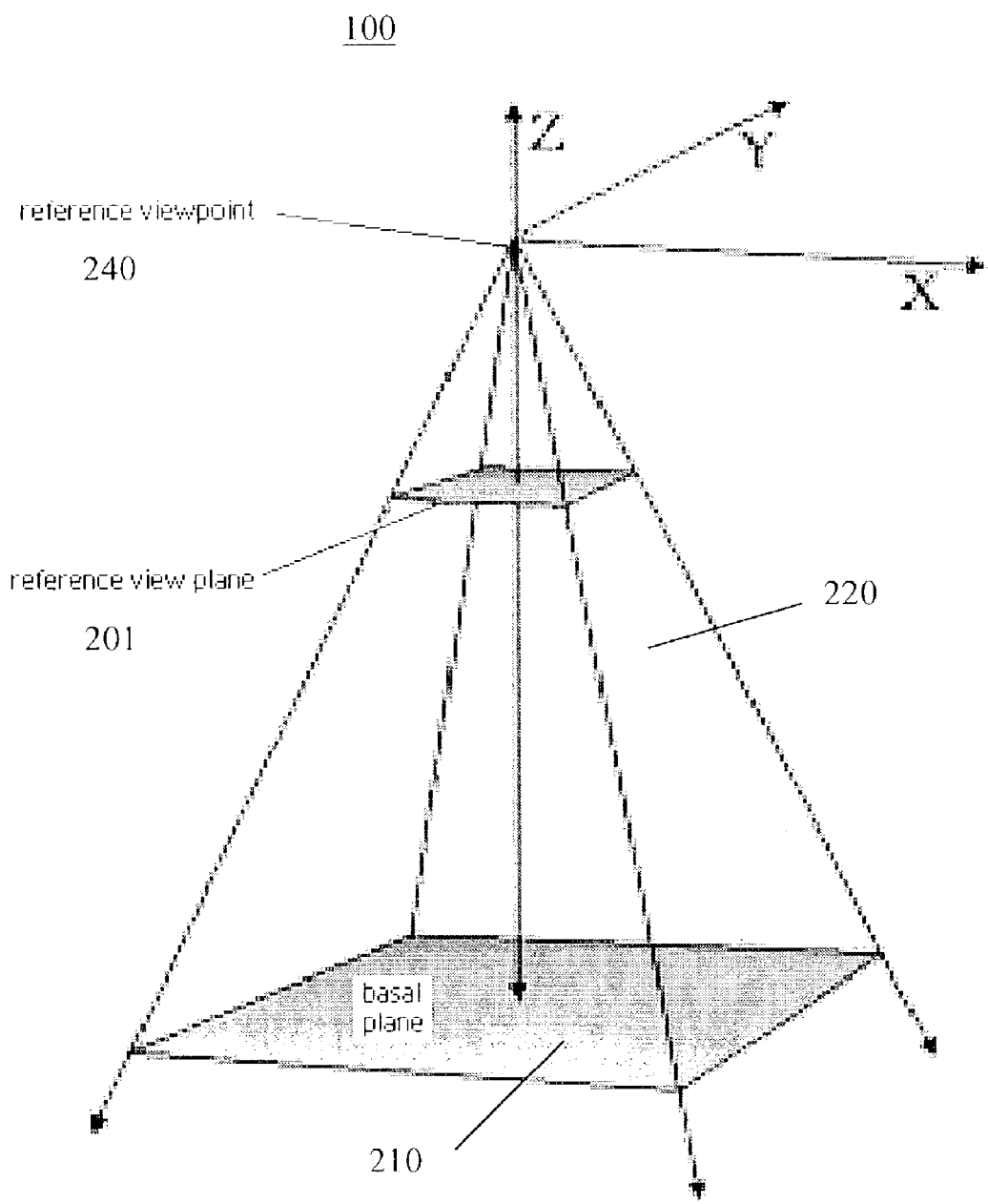
FIG. 1 is a graphical representation of the geometry for constructing a three--dimensional (3D) perspective viewing frustum, relative to an x, y, z coordinate system, in accordance with known elastic presentation space graphics technology.

FIG. 1 is a graphical representation 100 of the geometry for constructing a three-dimensional ("3D") perspective viewing frustum 220, relative to an x, y, z coordinate system, in accordance with known elastic presentation space (EPS) graphics technology. In EPS technology, detail-in-context views of two-dimensional ("2D") visual representations are created with sight-line aligned distortions of a 2D information presentation surface within a 3D perspective viewing frustum 220. In EPS, magnification of regions of interest and the accompanying compression of the contextual region to accommodate this change in scale are produced by the movement of regions of the surface towards the viewpoint ("VP") 240 located at the apex of the pyramidal shape 220 containing the frustum. The process of projecting these transformed layouts via a perspective projection results in a new 2D layout which includes the zoomed and compressed regions. The use of the third dimension and perspective distortion to provide magnification in EPS provides a meaningful metaphor for the process of distorting the information presentation surface. The 3D manipulation of the information presentation surface in such a system is an intermediate step in the process of creating a new 2D layout of the information.

Figure 2:
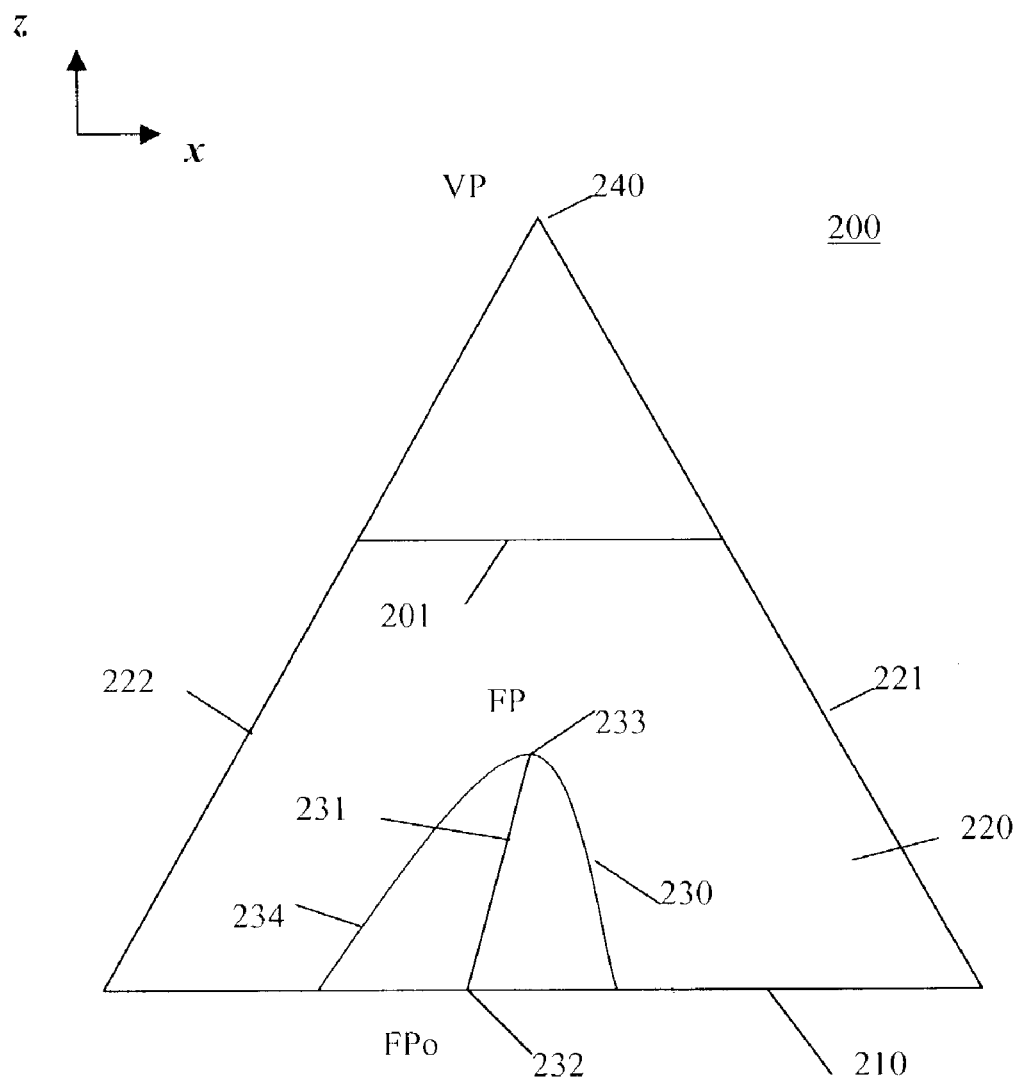
FIG. 2 is a graphical representation of the geometry of a presentation in accordance with known elastic presentation space graphics technology.

FIG. 2 is a graphics representation 200 of the geometry of a presentation in accordance with known EPS graphics technology. EPS graphics technology employs viewer-aligned perspective projections to produce detail-in-context presentations in a reference view plane 201 which may be viewed on a display. Undistorted 2D data points are located in a basal plane 210 of a 3D perspective viewing volume or frustum 220 which is defined by extreme rays 221 and 222 and the basal plane 210. The VP 240 is generally located above the centre point of the basal plane 210 and reference view plane ("RVP") 201. Points in the basal plane 210 are displaced upward onto a distorted surface 230 which is defined by a general 3D distortion function (i.e. a detail-in-context distortion basis function). The direction of the viewer-aligned perspective projection corresponding to the distorted surface 230 is indicated by the line FPo—FP 231 drawn from a point FPo 232 in the basal plane 210 through the point FP 233 which corresponds to the focus or focal region or focal point of the distorted surface 230.

EPS is applicable to multidimensional data and is well suited to implementation on a computer for dynamic detail-in-context display on an electronic display surface such as a monitor. In the case of two dimensional data, EPS is typically characterized by magnification of areas of an image where detail is desired 233, in combination with compression of a restricted range of areas of the remaining information (i.e. the context) 234, the end result typically giving the appearance of a lens 230 having been applied to the display surface. The areas of the lens 230 where compression occurs may be referred to as the "shoulder" 234 of the lens 230. The area of the representation transformed by the lens may be referred to as the "lensed area". The lensed area thus includes the focal region and the shoulder. To reiterate, the source image or representation to be viewed is located in the basal plane 210. Magnification 233 and compression 234 are achieved through elevating elements of the source image relative to the basal plane 210, and then projecting the resultant distorted surface onto the reference view plane 201. EPS performs detail-in-context presentation of n-dimensional data through the use of a procedure wherein the data is mapped into a region in an (n+1) dimensional space, manipulated through perspective projections in the (n+1) dimensional space, and then finally transformed back into n-dimensional space for presentation. EPS has numerous advantages over conventional zoom, pan, and scroll technologies, including the capability of preserving the visibility of information outside 234 the local region of interest 233.

For example, and referring to FIGS. 1 and 2, in two dimensions, EPS can be implemented through the projection of all image onto a reference plane 201 in the following manner. The source image or representation is located on a basal plane 210, and those regions of interest 233 of the image for which magnification is desired are elevated so as to move them closer to a reference plane situated between the reference viewpoint 240 and the reference view plane 201. Magnification of the focal region 233 closest to the RVP 201 varies inversely with distance from the RVP 201. As shown in FIGS. 1 and 2, compression of regions 234 outside the focal region 233 is a function of both distance from the RVP 201, and the gradient of the function describing the vertical distance from the RVP 201 with respect to horizontal distance from the focal region 233. The resultant combination of magnification 233 and compression 234 of the image as seen from the reference viewpoint 240 results in a lens-like effect similar to that of a magnifying glass applied to the image. Hence, the various functions used to vary the magnification and compression of the source image via vertical displacement from the basal plane 210 are described as lenses, lens types, or lens functions. Lens functions that describe basic lens types with point and circular focal regions, as well as certain more complex lenses and advanced capabilities such as folding, have previously been described by Carpendale.

Figure 3:
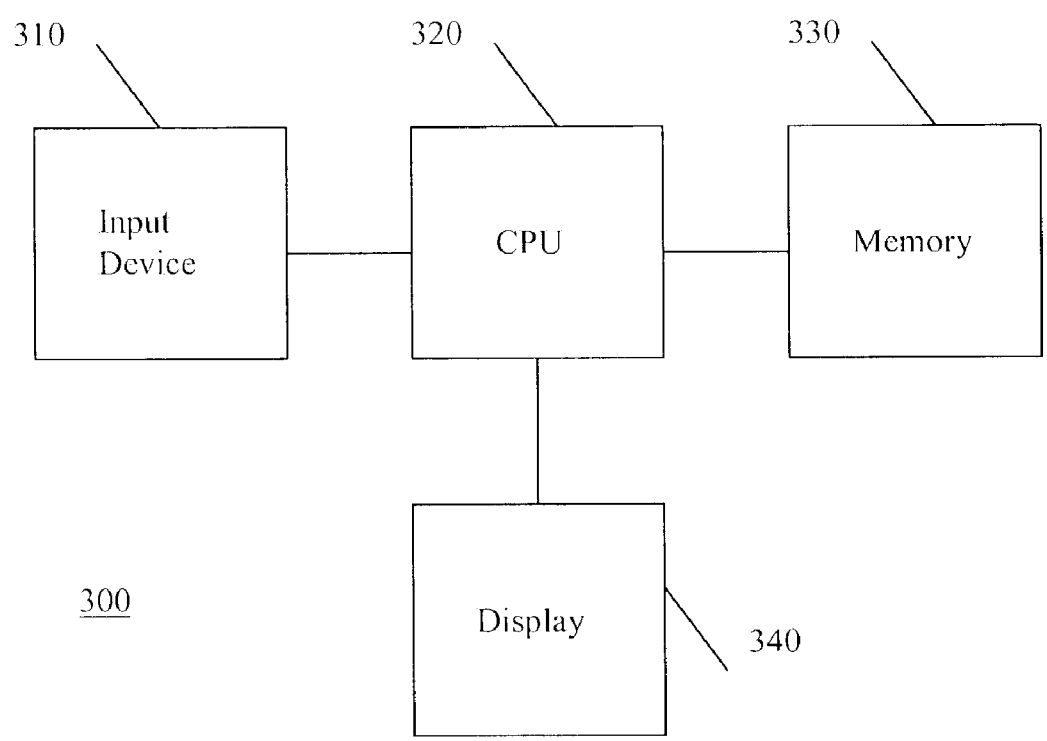
FIG. 3 is a block diagram illustrating an exemplary data processing system for implementing an embodiment of the invention.
Figure 4A:
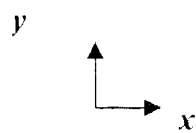
FIG. 4(a) is a top view of a source image texture map illustrating square source texels in accordance with an embodiment of the invention.
Figure 4A:
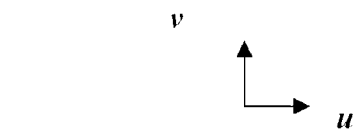
Figure 4A:
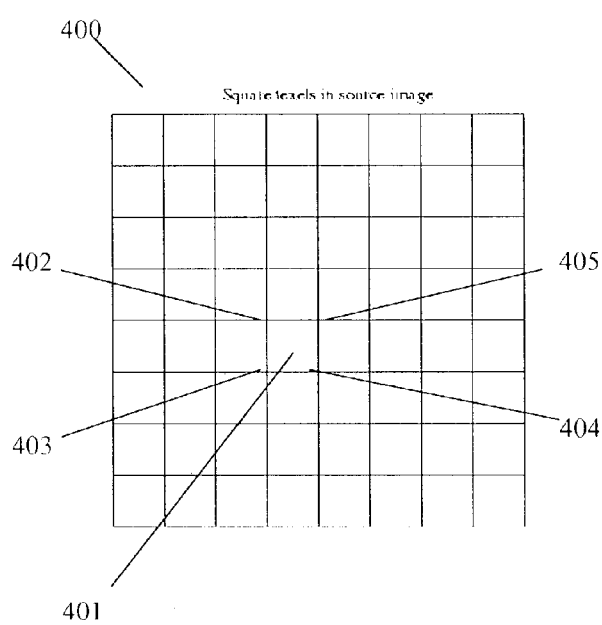
Figure 4B:
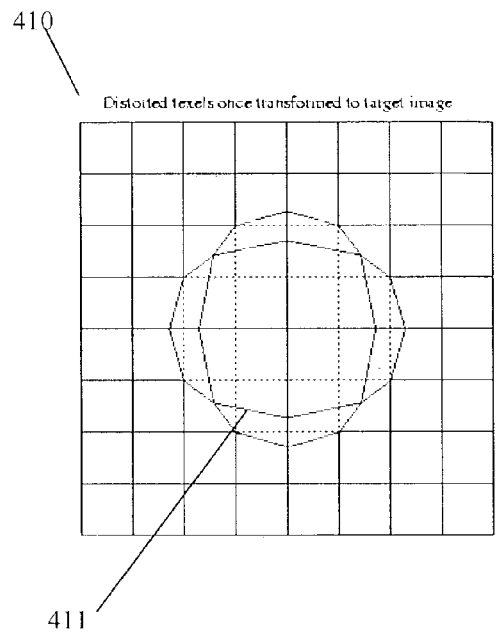
FIG. 4(b) is a top view of transformed coordinates of the boundaries of the square source texels of FIG. 4(a) as overlaid on square target texels of a target image textile map in accordance with an embodiment of the invention.

System. FIG. 3 is a block diagram of an exemplary data processing system 300 for implementing an embodiment of the invention. The data processing system is suitable for implementing EPS technology and for rendering detail-in-context lens presentations in conjunction with a graphical user interface ("GUI"). The data processing system 300 includes an input device 310, a central processing unit or CPU 320, memory 330, and a display 340. The input device 310 may include a keyboard, mouse, trackball, or similar device. The CPU 320 may include dedicated coprocessors and memory devices. The memory 330 may include RAM, ROM, databases, or disk devices. And, the display 340 may include a computer screen, terminal device, or a hardcopy producing output device such as a printer or plotter. The data processing system 300 has stored therein data representing sequences of instructions which when executed cause the method described herein to be performed. Of course, the data processing system 300 may contain additional software and hardware a description of which is not necessary for understanding the invention.

Method. The problem of rendering a raster image distorted through the use of PDT can be considered to be a problem of transforming texels between two image "spaces." In general, a texel (i.e. texture element) may be defined as a texture map pixel or pixels. The texels from the undistorted image can be said to belong to the "source" image space (i.e. representation), and the texels from the distorted image belong to the "target" image space (i.e. presentation). In general, all rendering approaches must somehow determine colour values for each target texel using the known source texels and the known PDT transformation. According to the present invention, time consuming pre-calculations of the displacements of the corners of each texel are first performed. These pre-calculations are then used to speed up actual rendering cycles. This results in speedy rendering times for individual frames at the cost of the time required to perform pre-calculations. In general, a pre-calculation step is performed when properties of a lens such as magnification level, focal region size, or lens bounds size are changed. The pre-calculation step is not performed when the position of the lens is changed (e.g. lens dragging). Thus, the method is optimized for lens dragging but not for manipulation of other lens properties (e.g. re-sizing). The pre-calculation step is followed by a rendering step. For reference, various lens manipulations using a GUI are described in Canadian Patent Applications Nos. 2,345,803 and 2,350,342, which are incorporated herein by reference.

FIG. 4(*a*) is a top view of a source image texture map 400 illustrating square source texels 401 in accordance with an embodiment of the invention. FIG. 4(*b*) is a top view of transformed coordinates 411 (i.e. transformed texel corner coordinates) of the boundaries of the square source texels 401 of FIG. 4(*a*) as overlaid on square target texels of a target image texture map 410 in accordance with an embodiment of the invention. The purpose of the pre-calculation step is to reduce the amount of computation necessary in the rendering step. Any computational result that can be arrived at once during the pre-calculation step and re-used repeatedly during the rendering step saves time during the rendering step. This is advantageous as it improves rendering speed.

In addition, pre-calculated results can be re-used during multiple renderings as long as only the position of the lens is changed. As will be described below, the relationship of the transformed texel coordinates with the target image texels is used to generate an associative table.

In the pre-calculation step, the distorted position of the corners 402, 403, 404, 405 of each source texel 401 is computed by passing their coordinates through the PDT distortion function for the corresponding lens so that each source texel 401 is mapped onto one or more texels 411 in the target image 410. In other words, the distortion function defining the lens is applied to the corners of each source texel 401 to produce transformed texel corner coordinates. The application of the distortion function may include coordinate system transformations. FIGS. 4(*a*) and 4(*b*) shows texels before 401 and after 411 this transformation step, respectively. In FIG. 4(*b*), the transformed texel corner coordinate 411 are shown as overlaid on the square texels of the target image 410. Note that in FIG. 4(*b*), the source and target images are of the same dimensions. However, this is not a requirement. That is, in the absence of a lens, there is not necessarily an exact one-to-one correspondence between source 401 and target 411 image texels.

Figure 5:
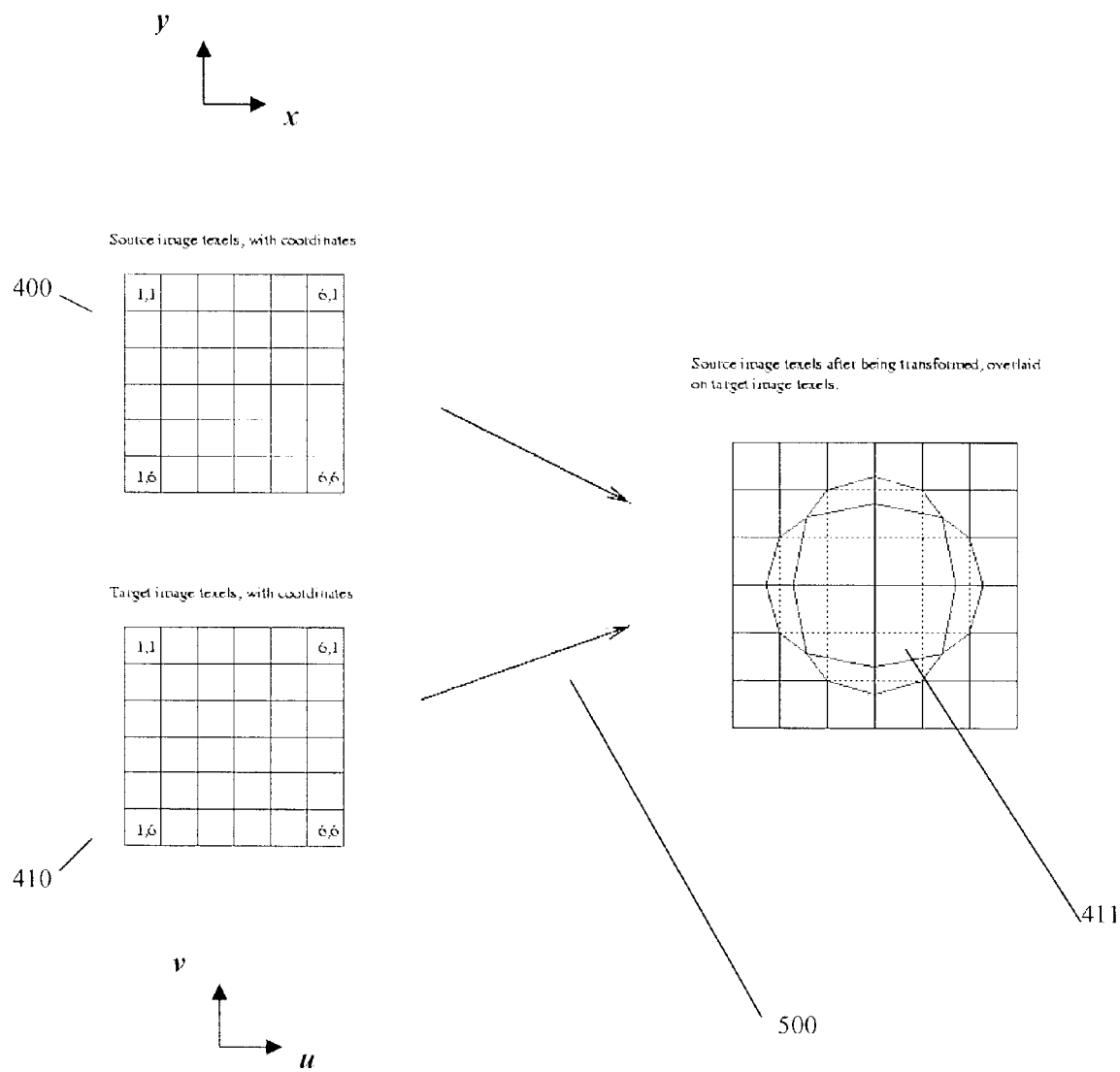
FIG. 5(a) is a top view of source and target image texture maps illustrating associative table construction in accordance with an embodiment of the invention.
FIG. 5(b) is a top view of source and target image texture maps illustrating source and target image reference frame offset vectors for associative table construction in accordance with an embodiment of the invention.
Figure 5:
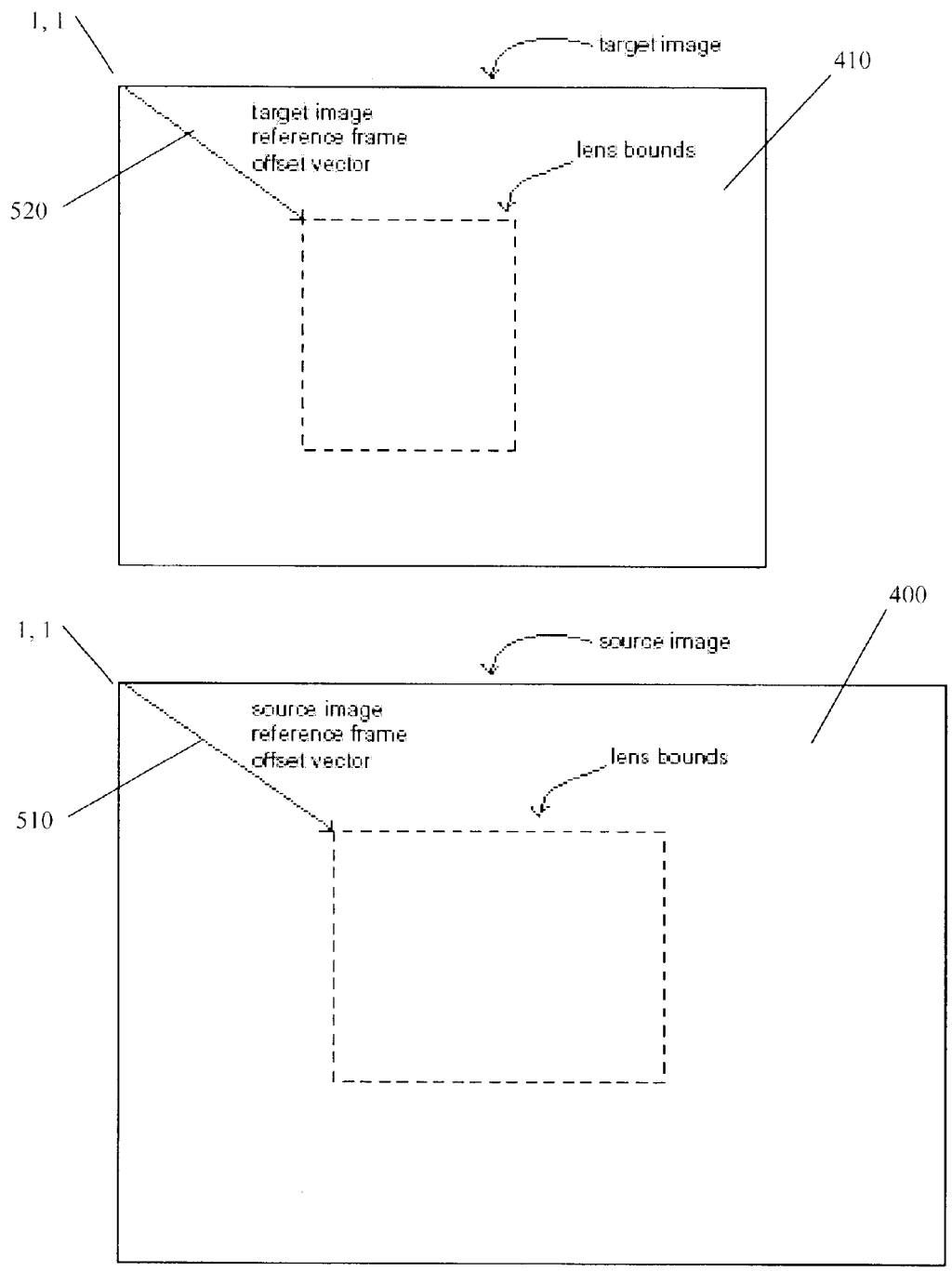

FIG. 5(*a*) is a top view of source and target image texture maps 400, 410 illustrating associative table construction 500 in accordance with an embodiment of the invention. During the pre-calculation step, a table associating source texels 401 with target texels 411 is constructed. This associative table can either associate individual source texels 401 with 0, 1, or multiple target texels 411, or, it can associate individual target texels 411 with 1 or multiple source texels 401. The coordinates in the table are recorded with respect to the reference frame of the lens. This makes it unnecessary for pre-calculations to be performed if the lens is moved. If a lens is moved, coordinates need only be offset as appropriate for the new lens position. An example of the table construction process 500 is shown in FIG. 5 and the resulting associative table is presented below as Table 1. In this example, one target texel is associated with one or more corresponding source texels.

TABLE 1

| Target Coordinate | Source Coordinate |
|---|---|
| 1,1 | 1,1 |
| 2,1 | 2,1 |
| 3,1 | 3,1 3,2 |
| 4,1 | 4,1 4,2 |
| 5,1 | 5,1 |
| 6,1 | 6,1 |
| 1,2 | 1,2 |
| 2,2 | 2,2 2,3 3,2 3,3 |
| 3,2 | 3,2 3,3 |
| 4,2 | 4,2 4,3 |
| 5,2 | 4,2 4,3 5,2 5,3 |
| 6,2 | 6,2 |
| 1,3 | 1,3 2,3 |
| 2,3 | 2,3 3,3 |

FIG. 5(*b*) is a top view of source and target image texture maps 400, 410 illustrating source and target image reference frame offset vectors 510, 520 for associative table construction 500 in accordance with an embodiment of the invention. Before taking the reference frame offset into account, the associative table of related pixels is created. This table treats the top left corner of the lens as being the origin. So, for example, one relationship may be 1,1 to 1,1 for the top left pixel as shown in the first row of Table 1 and in FIG. 5(*a*). Thus, if the pixel at position 1,1 in the source image 400 is simply copied to position 1,1 in the target image 410 it will become the top-left most pixel in the target image. In general, this is not the desired result unless it is desired that the lens be located in the top left corner of the presentation. To locate the lens elsewhere, an offset vector 510, 520 for the top left or the lens in both source and target images is determined. When pixels are copied from source to target, these two offset vectors 510, 520 are used to offset relationships recorded in the associative table for the lens. For example, if Vs is the offset vector for the source and Vt is the offset vector for the target, a translation from source to target may be expressed by the following assignment: pixelValueTarget(1,1+Vt)=pixelValueSource(1,1+Vs). This assignment is applicable for all values in the associative table including the value at position 1,1. Advantageously, if the lens is moved, the associative table need not be recalculated. Only the two offset vectors Vs and Vt need be determined to create a presentation of the relocated lens.

The process 500 for constructing the associative table involves the mapping of quadrilaterals (i.e. transformed texel corner coordinates 411) to square untransformed texels 401. In general, this does not result in an obvious 1:1 mapping or an obvious n:1 mapping. Sometimes a transformed texel is entirely contained in a target texel. At other times, it may barely touch the target texel. At still other times, it may overlap by a larger or partial amount. If anti-aliasing is desired, then a n:1 relationship may be constructed. If anti-aliasing is not desired, then a 1:1 relationship may be constructed. For 1:1 relationships, for each square target pixel 410 the "correct" transformed source pixel must be determined. This determination may take the form of choosing the transformed pixel the centre of which is closest to the centre of the target pixel. Or, this determination may take the form of choosing the transformed source pixel that overlaps the target pixel the most. For n:1 relationships, complexity increases. In this case, texels may be weighted differently and several different techniques may be used to determine which of several source pixels correspond with each individual target texel.

In summary, when texels 401 are transformed from source image space 400 to target image space 410, they are often no longer perfectly square. As a result, there is rarely an exact one-to-one correspondence between source texels 401 and target texels 410. As such, it is necessary to use a method of approximating texel coverage in order to construct the associative table. As mentioned above, different methods can be used to map transformed source texels onto target texels. To maximize speed, nearest neighbour matches can be used to map single source texels to single target texels. To maximize quality, anti-aliasing techniques call be used to take into account cases in which one target texel corresponds to multiple source texels. Anti-aliasing techniques can also incorporate weightings into the associative table in order to produce more accurate results.

Figure 6:
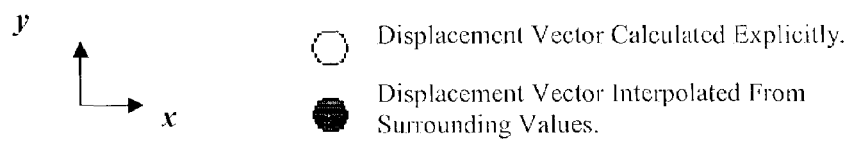
FIG. 6(a) is a top view of a source texture map illustrating source texel transformation interpolation in accordance with an embodiment of the invention.
FIG. 6(b) is a top view of a source texture map illustrating the interpolation of source texel corner coordinates in accordance with an alternate embodiment of the invention; and, FIG. 7 is a flow chart illustrating a general method for generating a detail-in-context presentation of a region-of-interest in accordance with an embodiment of the invention.
Figure 6:
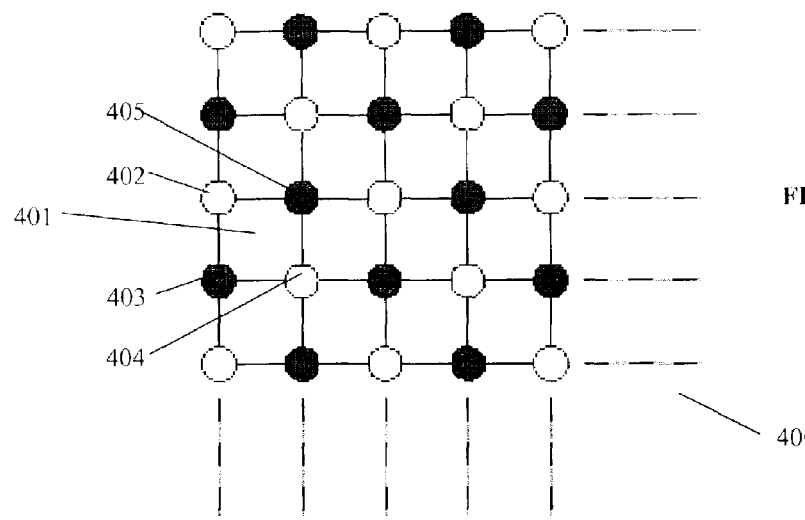
Figure 6:
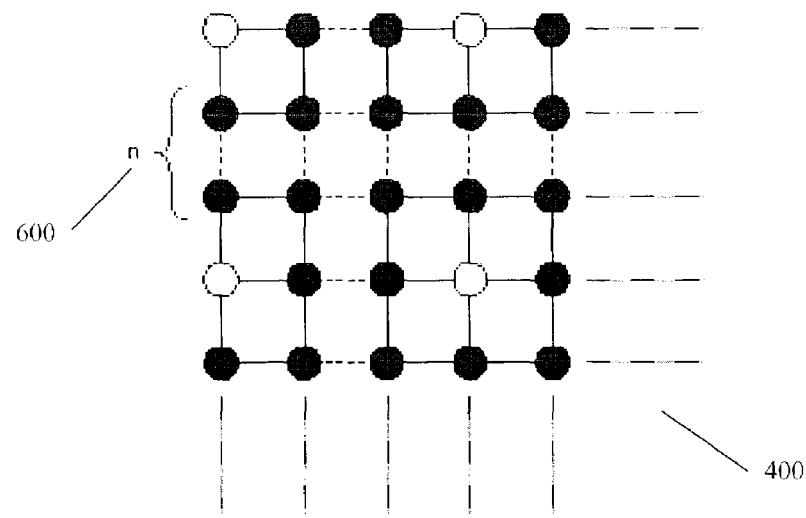

FIG. 6(*a*) is a top view of a source texture map 400 illustrating the interpolation of source texel 401 corner coordinates 402, 403, 404, 405 in accordance with an embodiment of the invention. The speed of the pre-calculation step may be improved by reducing the number of vector transformations performed on each individual texel 401. In accordance with an embodiment of the invention, instead of transforming every corner 402, 403, 404, 405 of every texel 401, for example, every other corner 402, 404 of the texel 401 can be transformed. The intermediate points 403, 405 are interpolated. This speeds up the pre-calculation step but reduces the accuracy (i.e. quality) of the result. At least two kinds of interpolation may be used including linear interpolation and perspective correct interpolation.

FIG. 6(*b*) is a top view of a source texture map 400 illustrating the interpolation of source texel 401 corner coordinates 402, 403, 404, 405 in accordance with an alternate embodiment of the invention. Here, rather that interpolating alternate pixels, any number n 600 of pixels may be skipped and these n 600 skipped pixels may be interpolated.

According to an alternate embodiment of the invention, rather than displacing the coordinates of texel corners from source space to target space in the pre-calculation step, an inverse operation is performed as follows. For each of the pixels contained within the bounds of the lens, an "undisplace" (i.e. the inverse of displace) operation is used to find the related source pixel. An advantage of this alternate method is that fewer operations may be required because, in general, the source image is usually larger than the target image. As such, the lens bounds will contain fewer pixels in target space than source space. Therefore, fewer undisplace operations may be required to progress from target pixels to source pixels. This alternate method is most advantageous when an undisplace operation is computationally less costly than a displace operation and when the lens does not include folding.

Following the pre-calculation step, the rendering step is performed. Advantageously, the rendering step is computationally simple and fast as a result of the calculations already performed during the pre-calculation step. First, a global offset, as determined by the position of the lens in both the source space 400 and the target space 410 and the corresponding offset vectors 510, 520, is determined. Then, the associative table is traversed. For each entry in the table, the exact source texel position(s) and target texel position are determined using the table entry and global offset. Texel values are then copied. If there are multiple source texels corresponding to a single target texel, colour values must be averaged, or weighted according to predetermined weights, before the colour value is set. After all table entries have been traversed, the final image is complete.

With respect to copying, if anti-aliasing is not required, then texel values are copied from a single source texel to a single target pixel. This copying may be performed by a straight memory copy (e.g. a memcpy, assignment, or 1-pixel bitblt operation). It anti-aliasing is required, one pixel is drawn to but a number of pixels are read from. As such, a number of read operations are performed. The read values are combined, for example, through weighting, and then a single write operation is performed. Depending on the status of anti-aliasing, the nature of storage media (i.e. main memory or video memory), differences in platforms, operating systems, and related factors, several copying techniques can be used as follows:

No anti-aliasing and main memory storage: memory copy, either explicitly or through an assignment;

Anti-aliasing and main memory storage: a sequence of memory reads, followed by filtering, followed by a single write to memory;

No anti-aliasing and video memory: bitblt or perhaps memory copy;

Anti-aliasing and video memory storage: a sequence of memory reads, followed by filtering, followed by a single write to memory.

With respect to weighting, several techniques can be used. For example, each pixel touched can be given an equal weight (i.e. averaged). Alternately, the exact coverage of each transformed pixel with the target pixel can be calculated and the weight can be related to the surface area of the coverage. Or, the distance from the center of each transformed pixel to the center of the target pixel can be determined and the weighting factor be related to that determined value. In addition, to increase speed, the number of pixels to be related may be limited by specifying that using a given weighting technique, a maximum of the N most strongly weighted pixels will be stored as being related, or that only pixels weighted greater than a value X will be stored.

If shading is desired, the copying may consist of a read operation, an operation to change the read value for shading purposes, and then a write operation. In other words, for shading, immediately before writing the colour value to the target pixel, the colour value is manipulated to darken it or lighten it by the desired amount to provide the desired shading effect. Any of the known shading algorithms may be used in this context.

Figure 7:
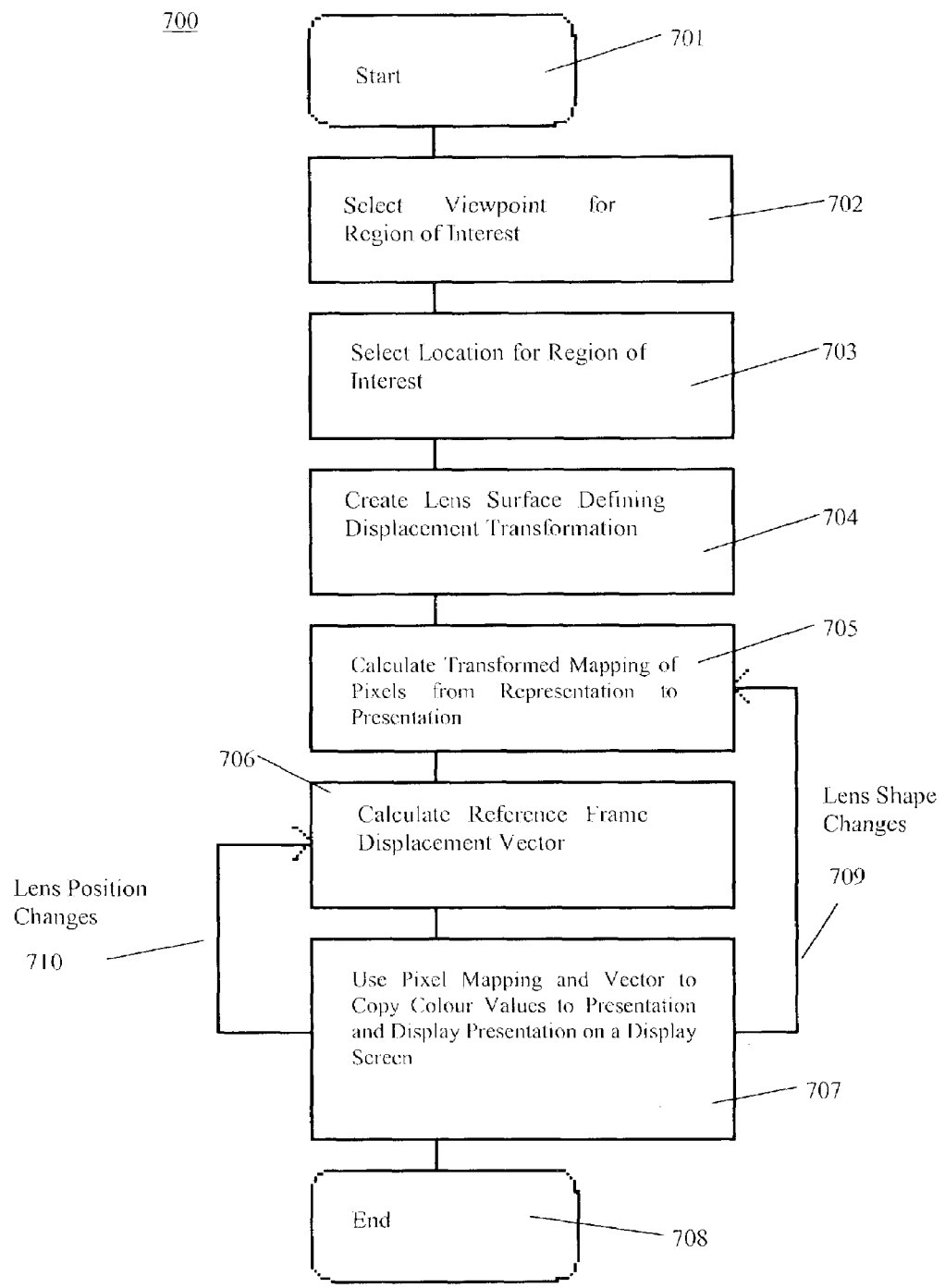

FIG. 7 is a low chart 700 illustrating a general method for generating a detail-in-context lens presentation of a region-of-interest in accordance with an embodiment of the invention. At step 701, the method starts. At step 702, a viewpoint 240 for the region-of-interest 233 is selected. At step 703, a location for the region-of-interest 233 is selected. At step 704, a lens surface 230 for the region-of-interest 233 is created. The lens surface 230 is defined by a distortion function and has a predetermined location for the region-of-interest 233. At step 705, a mapping for pixel coordinates from the representation to the lens surface in accordance with the distortion function is determined. At step 706, a displacement vector is determined from the predetermined location and the selected location for the region of interest. At step 707: pixel information from the representation is copied to the lens surface 230 according to the pixel mapping as displaced by the displacement vector; and, the projected lens surface is displayed on a display screen 340 to generate the presentation of the region-of-interest 233. At step 708, the method ends. The method allows for changes in lens surface shape 709 and changes in lens position 710. If the lens surface shape is changed 709, a new pixel mapping 705 will be required. If the lens position is changed 710, a new displacement vector 706 will have to be determined. The step of determining a mapping can include perspectively projecting the lens surface onto a plane spaced from the viewpoint. The copied pixel information can include colour information.

As described, the present invention includes two main computation steps. First, the pre-computation step calculates mappings between texels in the source and target image buffers. Second, the step of rendering these mapped texels is performed. On a typical system 300 the first step is much more time consuming to perform. It would be advantageous to perform the time consuming calculation of the first step without interrupting the continuous and timely rendering performed during the step. To accomplish this, the two main steps may be separated into two separate threads for processing. The rendering thread can use the most recent complete results of the pre-computing thread repeatedly (i.e. allowing lens movement but not lens reshaping) while the pre-computing the thread computes updated texel mappings. Furthermore, the pre-computing thread can monitor the states of the lenses and pause itself when pre-computing is not necessary. In addition, the separate threads can be run on multiple processing units 320 in order to maximize performance.

As the pre-calculations for mappings between texels are computationally time consuming, to improve performance these mappings can be transmitted over a network from the data processing system 300 to a remote machine so that the remote machine need not perform the pre-calculations itself. The pixel mappings can be stored in a format transmittable over a network (e.g. compressed and/or encrypted) and sent to a remote machine where that remote machine can use the mappings to generate local presentations. This feature is advantageous in situations where two remote machines need to synchronize their displays. It is also advantageous in situations where a powerful machine (e.g. a server) performs the pre-calculations and sends them to a less powerful machine (e.g. a PDA).

Texel mappings produced during the pre-calculation step can be stored in a file which can be compressed or encrypted. This is advantageous as it allows a lens shape to be archived for later retrieval or sharing with other systems and users.

Data Carrier Product. The sequences of instructions which when executed cause the method described herein to be performed by the exemplary data processing system of FIG. 3 can be contained in a data carrier product according to one embodiment of the invention. This data carrier product can be loaded into and run by the exemplary data processing system of FIG. 3.

Computer Software Product. The sequences of instructions which when executed cause the method described herein to be performed by the exemplary data processing system of FIG. 3 can be contained in a computer software product according to one embodiment of the invention. This computer software product can be loaded into and run by the exemplary data processing system of FIG. 3.

Integrated Circuit Product. The sequences of instructions which when executed cause the method described herein to be performed by the exemplary data processing system of FIG. 3 can be contained in an integrated circuit product including a coprocessor or memory according to one embodiment of the invention. This integrated circuit product can be installed in the exemplary data processing system of FIG. 3.

Although preferred embodiments of the invention have been described herein, it will be understood by those skilled in the art that variations may be made thereto without department from the spirit of the invention or the scope of the appended claims.

The embodiments of the invention in which an exclusive property or privilege is claimed are defined as follows:

1. A method for generating a presentation of a region-of-interest in an information representation for display on a display screen, comprising:
    determining a mapping of original texel corner coordinates in said representation to distorted texel corner coordinates for a lens initially located at a first location in said representation, said distorted texel corner coordinates produced by applying a two-dimensional distortion function defining said lens to said original texel corner coordinates, said lens for rendering within said presentation a magnified region for said region-of-interest at least partially surrounded by an at least partially compressed region where said magnification decreases to that of said representation surrounding said lens to provide context for said magnified region with respect to said representation, said representation having uniform texels, each texel having at least three corners, and each corner having a respective original texel corner coordinate;
    calculating a displacement from said first location to a second location in said representation, said second location being that of said region-of-interest;
    adjusting said mapping with said displacement to produce an adjusted mapping to thereby relocate said lens to said second location;
    copying texel information from said representation to said relocated lens at said second location according to said adjusted mapping to thereby generate said presentation of said region-of-interest; and
    displaying said presentation on said display screen.

2. The method of claim 1 wherein said texel information includes at least one of texture information and colour information.

3. The method of claim 1 wherein said determining a mapping is performed by a first software thread and said calculating a displacement, adjusting said mapping, and copying texel information are performed by a second software thread.

4. The method of claim 3 wherein said first and second software threads are run on separate processors.

5. The method of claim 3 wherein said first and second software threads monitor one another.

6. The method of claim 1 and further comprising storing said mapping as a file.

7. The method of claim 6 wherein said file is at least one of a compressed file and an encrypted file.

8. The method of claim 7 and further comprising transmitting said file over a network to a remote processor for generating a local presentation.

9. The method of claim 8 wherein said remote processor is at least one of a PDA and a cellular telephone.

10. A system for generating a presentation of a region-of-interest in an information representation for display on a display screen, comprising:
    a processor coupled to memory and the display screen; and,
    modules within the memory and executed by the processor, the modules including:
    a module for determining a mapping of original texel corner coordinates in the representation to distorted texel corner coordinates for a lens initially located at a first location in the representation, the distorted texel corner coordinates produced by applying a two-dimensional distortion function defining the lens to the original texel corner coordinates, the lens for rendering within the presentation a magnified region for the region-of-interest at least partially surrounded by an at least partially compressed region where the magnification decreases to that of the representation surrounding the lens to provide context for the magnified region with respect to the representation, the representation having uniform texels, each texel having at least three corners, and each corner having a respective original texel corner coordinate;
    a module for calculating a displacement from the first location to a second location in the representation, the second location being that of the region-of-interest;
    a module for adjusting the mapping with the displacement to produce an adjusted mapping to thereby relocate the lens to the second location;
    a module for copying texel information from the representation to the relocated lens at the second location according to the adjusted mapping to thereby generate the presentation of the region-of-interest; and,
    a module for displaying the presentation on the display screen.

11. The system of claim 10 wherein the texel information includes at least one of texture information and colour information.

12. The system of claim 10 wherein the module for determining a mapping is performed by a first software thread and the modules for calculating a displacement, adjusting the mapping, and copying texel information are performed by a second software thread.

13. The system of claim 12 wherein the first and second software threads are run on separate processors.

14. The system of claim 12 wherein the first and second software threads monitor one another.

15. The system of claim 10 and further comprising a module for storing the mapping as a file.

16. The system of claim 15 wherein the file is at least one of a compressed file and an encrypted file.

17. The system of claim 16 and further comprising a module for transmitting the file over a network to a remote processor for generating a local presentation.

18. The system of claim 17 wherein the remote processor is at least one of a personal digital assistant ("PDA") and a cellular telephone.

* * * * *

UNITED STATES PATENT AND TRADEMARK OFFICE
CERTIFICATE OF CORRECTION

PATENT NO.         : 7,275,219 B2
APPLICATION NO.    : 10/358385
DATED              : September 25, 2007
INVENTOR(S)        : Garth B. D. Shoemaker It is certified that error appears in the above-identified patent and that said Letters Patent is hereby corrected as shown below:

Column 1, line 8: Replace the word "Filed" with the word --filed--.

Column 1, line 10: Replace the word "computer-graphics" with the words --computer graphics--.

Column 2, line 21: Replace the word "under-gone" with the words --under gone--.

Column 3, line 12: Replace the word "three--dimensional" with the word --three-dimensional--.

Column 4, line 34: Replace the word "graphics" with the word --graphical--.

Column 5, line 17: Replace the word "all" with the word --an--.

Column 7, line 40: Replace the word "or" with the word --of--.

Column 9, line 11: Replace the word "It" with the word --If--.

Column 9, line 51: Replace the word "low" with the word --flow--.

Column 11, line 7: Replace the word "department" with the word --departing--.

Signed and Sealed this

Twenty-seventh Day of November, 2007

JON W. DUDAS
*Director of the United States Patent and Trademark Office*